United States Patent Office 3,591,571
Patented July 6, 1971

3,591,571
SUPERCHLORINATED POLYVINYL CHLORIDE
AND METHOD OF PRODUCING IT
Georgette Steinbach-Van Gaver, Paris, France, assignor to Produits Chimiques Pechiney-Saint-Gobain, Paris, France
No Drawing. Filed Feb. 15, 1966, Ser. No. 527,476
Claims priority, application France, Feb. 16, 1965, 5,758
Int. Cl. C08f 27/02, 27/03
U.S. Cl. 260—92.8                                  14 Claims

ABSTRACT OF THE DISCLOSURE

Process for the production of superchlorinated polyvinyl chloride and product thereof. The PVC is swollen in a first step by insufflating with gaseous chloro-hydrocarbon of which chloroform is preferred. The swollen PVC is suspended in a concentrated aqueous solution of HCl. Chlorine is then passed into the suspension to about saturation, after which the suspension is irradiated with ultraviolet rays, while chlorination is continued to the desired value. The process is of relatively short duration, efficient in use of ingredients and reactants, and gives a high quality of SPVC of uniform granulometry and precise control of chlorine percentage of finished product.

This invention relates to superchlorinated polyvinyl chloride (SPVC) and to a novel method of making it.

It is known that polyvinyl chloride (PVC) can be chlorinated and that the product has improved heat resistance. Chlorination has been carried out by chlorinating the particulate polymer in aqueous hydrochloric acid suspension in the presence of a chlorinated solvent, but with the fault that the solvent promotes gelling and even dissolves the SPVC and agglomerates some of the polymer, obstructing the agitation of the bath, and producing a low yield of a product of properties inadequate to some uses. These faults have been the worse as the chlorine content is the higher, reaching a peak when it is sought to introduce more than 65% of chlorine.

It is an object of this invention to produce SPVC, with speed and without loss of product, having superior heat resistance and other superior properties. It is another object to yet further improve the new SPVC. It is also an object to chlorinate PVC in the presence of a chlorinated swelling agent without gelling, without loss by solution, without degradation of product, with increased fluidity of the bath and with better yield. Another object is to prepare SPVC fibers and filaments of superior quality.

The objects are accomplished, generally speaking, by a method of preparing SPVC which comprises swelling PVC with a chlorinated hydrocarbon swelling agent, and chlorinating the swollen PVC by a gaseous chlorinating agent under irradiation. The swelling agents are halogenated aliphatic hydrocarbons containing one or two carbon atoms, for instance carbon tetrachloride, tetrachloroethane, and chloroform, of which the latter is preferred. The novel products have a chlorine content up to 73.2% by weight and a sequence of softening temperatures extending from 90° C. to about 180° C.

The PVC is generally used in particulate form but it may be in fibers, plates, and formed objects. It may have been produced by any method, it may already have been partly superchlorinated, and it may be of any molecular mass, e.g. from 35,000 to more than 800,000. These molecular masses may be expressed by the K value (Fikentscher), the AFNOR index (French test NF T 51,013), by direct measurement by light diffusion, or otherwise.

The molecular mass of PVC may be controlled in production by the temperature at which polymerization of the monomer is carried out. For molecular masses of 68,500; 110,000; 160,000; 350,000; 415,000; 715,000; and 1,000,000 the appropriate temperatures are respectively 65° C.; 58° C.; 42° C.; −1° C.; −6° C.; −12° C.; −35° C. The higher products have the better properties, but these are further improved by the present process.

The PVC is swollen, in a preliminary step, by contact with the vapors of a chlorinated solvent, the swollen PVC is suspended in aqueous HCl, and is chlorinated by gaseous chlorine in the presence of radiation. Ultraviolet light is preferred, in wave lengths from 1800 to 4500 A. of which the range 3400–4000 A. is best, especially as it permits the use of glass apparatus.

The preliminary swelling of the PVC is by contact with the vapors of a chlorinated swelling agent, among which chloroform is preferred. Enough of the vapor is brought into contact with the PVC to permit the chlorination to proceed with maximum speed and to the completion desired. The aspect of the PVC is not otherwise changed.

In one preferred method polyvinyl chloride grains are evacuated to a pressure circa 8–12 mm. Hg at 45–55° C. with or without agitation. Vapors of the chlorinated solvent are flowed through the PVC and absorbed by it. It is equally efficient to use atmospheric pressure but to replace the air in the powder by an inert gas, e.g. nitrogen, the insufflation with vapors of chlorinated solvent then going forward at similar temperature. In either modification swelling takes about 15–60 minutes to bring about 15–20% by weight of solvent into contact with the PVC, the absorption being about 12–18%.

When the chlorination is carried out the HCl solution may be of any substantial concentration but 5.5 to 6 N is efficient. At this concentration the chlorine has good solubility in the medium at the temperatures used, and secondary reactions of hydrolysis and photolysis are eliminated. About 4 to 5 liters of HCl solution are used per kg. of PVC.

The chlorine is flowed through the reaction medium, HCl solution, at a rate that provides a small excess beyond what is necessary for the reaction, for instance several percent in excess. The rate of chlorination recedes as the content of chlorine in the PVC increases, and this permits a gradual reduction of the rate of addition, the same small excess being maintained. As the chlorination proceeds the solvent occluded is gradually eliminated from the product by entrainment in unreacted chlorine and HCl which forms during the reaction.

The general boundaries of temperature are large, e.g. about 10 to 70° C. but it is better to operate at about 50–60° C. as this prevents too rapid loss of the swelling agent from the product and provides efficient and swift chlorination. By saturating the reaction medium with chlorine in low light or dark before irradiation the fixing of chlorine on those C atoms of the PVC which are already chlorinated is avoided.

This process readily produces SPVC from 56.8 to 73.2% chlorine by weight, and as each different content is a useful product, but with different properties, the range of useful and different products is wide. The properties of the SPVC are the higher as the quantity of chlorine applied is the greater and as the molecular mass is the greater. After chlorination to the desired end point has been attained, the residual chlorine and solvent may be removed by the flow of an inert gas such as nitrogen, and the chlorinated polymer is isolated, washed and dried by ordinary methods.

The apparatus is not a part of this invention, and can be of any useful kind.

The products have the shapes they had at the beginning, and look about the same, but they have superior properties. They may be powders, sheets, films, molded, threads, or other shapes. They are superior to the starting materials, especially in softening temperature, drawing temperature, resistance to size change under boiling water, strength, and elongation for film and fiber formation. They may be further improved, if it be desirable, by incorporating stabilizers such as lime and organotin compounds, which can be introduced after chlorination or introduced in the course of the polymerization of the vinyl chloride, by known techniques.

The chlorinated hydrocarbon swelling agents must be in vapor state at the temperature at which the swelling of the PVC is accomplished.

The following examples illustrate the invention without restricting the generality of what is elsewhere herein stated.

EXAMPLE 1

A cylindrical mixer of 25 l. capacity containing an agitator of paddle type, having an inlet and an outlet for gases and solids and a vacuum pump attached to the outlet for gases, which was equipped with a circulating water jacket, received 5 kg. of polyvinyl chloride of K value 61.5, molecular mass 90,000, which passed a screen of .63 mm. apertures and had been made in mass at 60° C. The PVC was heated to 50° C. under a reduced pressure of 10 mm. Hg and received a flow of 900 g. chloroform vapor. The mass was agitated for 40 minutes at 50° C., cooled and returned to atmospheric pressure by flowing nitrogen through it. The powder was swollen and contained 800 g. of the chloroform.

A vertical cylindrical glass autoclave of which the height was 5 times its width and the capacity was 38 l., supported a thermometer, an agitator, and a funnel-shaped inlet for chlorine at its base above which rested a plate of porous fritted glass. It had a discharge valve in the base. At the upper part it had a gas outlet surmounted by a vertical condenser provided with means for a flow of cold methanol. The condenser was attached to an enclosure containing soda which captured the HCl formed in the process, the excess of chlorine, and the chloroform which escaped the condenser. Seven lamps of wave length 3400–4000 A. surrounded the transparent reactor.

22 l. of 6 N HCl solution received 5 kg. of the swollen PVC, the suspension was agitated in the dark at 50° C. and 10.7 g./min. of a flow of chlorine was received to saturation. The lamps were turned on, the mass was heated to 55° C., the flow was increased to 55 g./min. to provide an excess of chlorine in the reaction medium. As the chlorination progressed its rate decreased and the flow was gradually reduced. After 1 hour of reaction the flow was 26 g./min. of chlorine, the operation was ended by turning the light off, the apparatus was swept free of chlorine and chloroform by a flow of nitrogen, and the temperature was reduced to room temperature.

The SPVC was centrifuged to eliminate liquid, washed in water at 50° C., and dried. The product was SPVC, weight 6.12 kg., a white powder, containing 65.2% of chlorine.

The same example was carried out with changed times of reaction, producing the following products, which are compared with SPVC which underwent the identical process without being swollen.

| Duration of chlorination in minutes | 20 | 40 | 60 | 80 | 100 | 120 | 140 |
|---|---|---|---|---|---|---|---|
| Percent chlorination: | | | | | | | |
| Without swelling | | 60 | 62.2 | 63.7 | 64.7 | 65.5 | 66 | 66.4 |
| With swelling | 61.3 | 63.7 | 65.2 | 66.2 | 67 | 67.6 | 68.4 |

The favorable effect of the swelling is evident.

EXAMPLE 2

A 40 l. stainless steel autoclave equipped with a vertical blade agitator received 5 kg. of PVC of K value 127, and molecular mass 715,000, which had been made by polymerization at −12° C. The air of the autoclave was three times voided by vacuum and returned to atmospheric pressure with nitrogen. It was heated to 50° C. and 960 g./hr. of chloroform vapor at 140° C. was flowed through with agitation at 300 r.p.m. After the hour the temperature was reduced to 20° C. and agitation ended. The polymer was swollen and had absorbed 780 g. of chloroform.

The swollen PVC was chlorinated as in Example 1 and after 100 minutes of reaction the chlorine content reached 65%. After 135 minutes it was 68%. When the same process was carried out on the same material without swelling it the times required to reach the same chlorine content were 230 minutes and 720 minutes. The saving in time, the increased use of equipment, and the saving in investment for equipment are advantages of major degree. The invention is 2.5 to 5 times more efficient than the prior art.

EXAMPLE 3

As described in Example 1 several test pieces of different degrees of superchlorination were made. After evacuation of the suspension the superchlorinated polymers were filtered, washed to neutrality, and again filtered. The moist powders contained 6 kg. of SPVC and 10 kg. of water. They were soaked in 30 l. of a .18% solution of CaO by weight with 30 minutes of agitation at room temperature, drained and dried in an oven at 50° C., yielding SPVC of about 1% lime as a stabilizer.

To each 100 g. of this product were added .5 g. of mineral wax lubricant and 5 g. of tin dibutylthiomaleate stabilizer. The mixtures produced were laminated between 160 and 200° C., according to the PVC used as raw material and the chlorine content. These were cut into sheets, pressed in a mold 40 x 100 x 4 mm. at 180–210° C. under 100 kg./cm.$^2$. These were tested for the softening temperature (Vicat) by the test NF T 51–021. The results are entabled as follows:

| Chlorine content in percent | PVC, 56.8 | SPVC | | | | | | |
|---|---|---|---|---|---|---|---|---|
| | | 60 | 62 | 64 | 66 | 68 | 70 | 72 |
| PVC used— | | | | | | | | |
| Polymerization temperature, ° C. | K value | Molecular mass | Softening temperature, ° C. (Vicat) | | | | | |
| 75 | 47 | 35,800 | 90 | 96 | 101 | 107 | 112 | 120 | 127 | 134 |
| 65 | 57 | 68,500 | 92 | 98 | 104 | 111 | 117 | 125 | 132 | 140 |
| 60 | 61.5 | 90,000 | 93 | 101 | 106 | 113 | 121 | 130 | 138 | 145 |
| 42 | 80 | 160,000 | 94 | 103 | 109 | 116 | 125 | 135 | 143 | 153 |
| −1 | 108.8 | 350,000 | 97 | 106 | 114 | 123 | 132 | 143 | 154 | 165 |
| −6 | 116 | 415,000 | 100 | 109 | 117 | 125 | 135 | 147 | 157 | 172 |
| −12 | 127 | 715,000 | 103 | 112 | 120 | 129 | 140 | 151 | 162 | 175 |

It is to be noted that the softening tempreature rises with the K value of the starting PVC and the chlorine content of the SPVC.

EXAMPLE 4

100 g. of SPVC of 68% chlorine (Example 2) was dissolved with agitation in 350 g. of tetrahydrofurane. The solution was formed into a film 1 mm. thick by passing it through a narrow slit and air drying to remove the solvent. It was drawn out at 175° C. and showed no reaction in water at 100° C.

EXAMPLE 5

Proceeding as in Example 4 but with SPVC of 68.4% chlorine (Example 1), when drawn at 145° C. the film had 5% retraction in 100° C. water.

EXAMPLE 6

100 g. of SPVC of 65% chlorine (Example 2) were dissolved in a mixture of 120 g. $CS_2$ and 180 g. acetone at 60° C. and 1.6 bar pressure, producing a viscous liquid which was passed through an aperture ten hundredths mm. wide. The fiber was dried by hot air flow and was hot drawn and subjected to relaxation. Its tenacity in g./denier was 6.2 and its elongation was 19%.

EXAMPLE 7

100 g. of SPVC of 65.2% chlorine (Example 1) were put in an autoclave with 150 g. acetone, 130 g. benzene, and 20 g. cyclohexanone. After agitation for 20 minutes at 80° C. at .8 bar a viscous liquid was obtained and passed through a multihole fibering head having orifices .1 mm. in diameter. The solvent was eliminated by coagulation and the fibers were hot drawn and relaxed. They had 4.2 g./denier tenacity and 23% elongation.

EXAMPLE 8

A skein of filaments was formed in the usual way from PVC of K value 127 and molecular mass 715,000 by polymerization at −12° C. It was swollen by chloroform vapors under vacuum (Example 1) but without agitation. The skein was chlorinated according to Example 1 and the reaction medium was agitated by flowing N through it. After 1 hour the chlorine content was 65% and the skein was washed and dried. The filaments of the skein had 5.9 g./denier tenacity and no shrinkage in water at 100° C.

EXAMPLE 9

Example 8 was repeated with a skein prepared from PVC of K value 61.5 molecular mass of 90,000, at 60° C. After chlorination to 65% chlorine the filaments had 4 g./denier tenacity and 7% retraction in 100° C. water.

The advantages of the invention include a novel process of superchlorination which minimizes or wholly obviates all previous major objections to and difficulties in the use of swelling agents in the preparation of SPVC. Other advantages are the preparation of a whole family of superior products including filaments of especial value. Other advantages are the accomplishment of each of the objects of the invention as listed above. Economically the process is greatly superior to prior processes, being faster, more efficient, more uniform, and less costly in labor and equipment.

As many apparently widely different embodiments of the present invention may be made without departing from the spirit and scope thereof, it is to be understood that the invention is not limited to the specific embodiments.

What is claimed is:

1. The method of preparing superchlorinated polyvinyl chloride, comprising the sequential steps of (a) contacting polyvinyl chloride with a gaseous chloro-hydrocarbon to effect swelling of the polyvinyl chloride, (b) suspending the swollen polyvinyl chloride in aqueous HCl solution, and (c) passing gaseous chlorine through the suspension in the presence of ultra-violet radiation.

2. The method of claim 1, said chloro-hydrocarbon being chloroform, said contacting being carried out at about 45°–55° C. for about 15 to 60 minutes.

3. The method of claim 2, step (a) being carried out under a pressure of about 8–12 mm. Hg abs.

4. The method of claim 1, said step (b) being carried out at about 10 to 70° C., in an HCl solution of about 5.5 to 6 N.

5. The method of claim 1, said radiation being in the range 1800 to 4500 A., and preferably 3400 to 4000 A.

6. The method of claim 2, said step (c) being effected by saturation of the suspension with chlorine, then initiating radiation while continuing the passing of chlorine through the suspension.

7. A method according to claim 3 in which the superchlorinated polyvinyl chloride is swept by an inert gas after the chlorination has been terminated.

8. A process according to claim 1 in which the polyvinyl chloride contains a heat stabilizer.

9. A process according to claim 1 in which the superchlorinated polyvinyl chloride is washed with an aqueous solution of a stabilizing agent of the types of lime and organotin compounds.

10. The method of producing superchlorinated polyvinyl chloride comprising, the sequential steps of (a) passing gaseous chloroform through granular polyvinyl chloride, at a temperature of about 45–55° C., to effect swelling of the polyvinyl chloride, (b) suspending the swollen polyvinyl chloride in an aqueous solution of HCl of 5.5 to 6 N, and (c) subjecting the suspension to ultra-violet radiation of about 1800 to 4500 A., while flowing gaseous chlorine through the suspension.

11. The method of claim 10, step (a) being carried out under a pressure of about 8 to 12 mm. Hg abs., for about 15 to 60 minutes.

12. The method of claim 10, step (a) being carried out under atmospheric pressure and in the presence of an inert gas, for about 15 to 60 minutes.

13. The method of claim 10, step (c) being carried out with a gradual reduction in rate of flow of chlorine.

14. The method of claim 11, step (b) being for about one hour, step (c) being for about 20 to 140 minutes, in direct proportion to the percentage of chlorination desired.

References Cited
UNITED STATES PATENTS 2,996,489    8/1961    Dannis et al. _____ 260—92.8A JOSEPH L. SCHOFER, Primary Examiner J. A. DONAHUE, Jr., Assistant Examiner